United States Patent [19]

Tsuboyama et al.

[11] Patent Number: 4,728,176
[45] Date of Patent: Mar. 1, 1988

[54] FERROELECTRIC LIQUID CRYSTAL DEVICE WITH METALLIC AUXILIARY ELECTRODES PROVIDED ADJACENT TO THE TRANSPARENT ELECTRODES

[75] Inventors: Akira Tsuboyama; Hiroyuki Kitayama, both of Tokyo, Japan

[73] Assignee: Canon Kabushiki Kaisha, Tokyo, Japan

[21] Appl. No.: 918,377

[22] Filed: Oct. 14, 1986

[30] Foreign Application Priority Data

Oct. 17, 1985 [JP] Japan ................................ 60-229973

[51] Int. Cl.⁴ .............................................. G02F 1/13
[52] U.S. Cl. ......................... 350/350 S; 350/339 R; 350/341
[58] Field of Search ............... 350/350 S, 339 R, 341

[56] References Cited

U.S. PATENT DOCUMENTS 4,556,727 12/1985 Walba ............................. 350/350 S
4,561,726 12/1985 Goodby et al. ................. 350/350 S
4,634,228 1/1987 Iwaski et al. .................... 350/350 S

FOREIGN PATENT DOCUMENTS 8606507 11/1986 PCT Int'l Appl. ............. 350/350 S
2174820 11/1986 United Kingdom ........... 350/350 S Primary Examiner—Stanley D. Miller
Assistant Examiner—Trong Quang Phan
Attorney, Agent, or Firm—Fitzpatrick, Cella, Harper & Scinto

[57] ABSTRACT

A liquid crystal device having a cell structure including two base plates each provided with transparent electrodes and a the ferroelectric liquid crystal disposed between the base plates. Adjacent to the transparent electrodes, auxiliary electrodes ordinarily composed of a metal are disposed so as to lower the resistance of the transparent electrodes. Insulating films are also disposed alternately with the auxiliary electrodes so as to provide a flat surface, whereby generally flat surfaces contacting the ferroelectric liquid crystal are formed to provide a uniform monodomain free of alignment defects. Thus, proper driving characteristics of ferroelectric liquid crystal device are provided.

15 Claims, 5 Drawing Figures

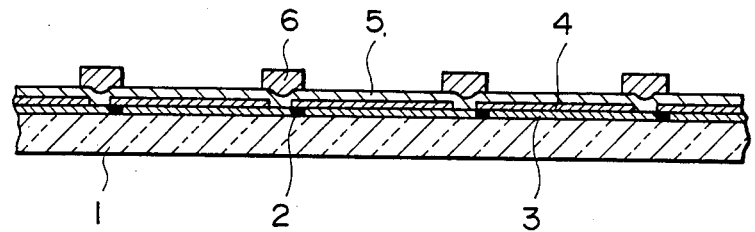
F I G. 1A
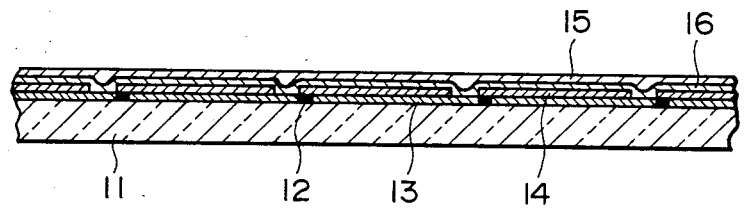
F I G. 1B
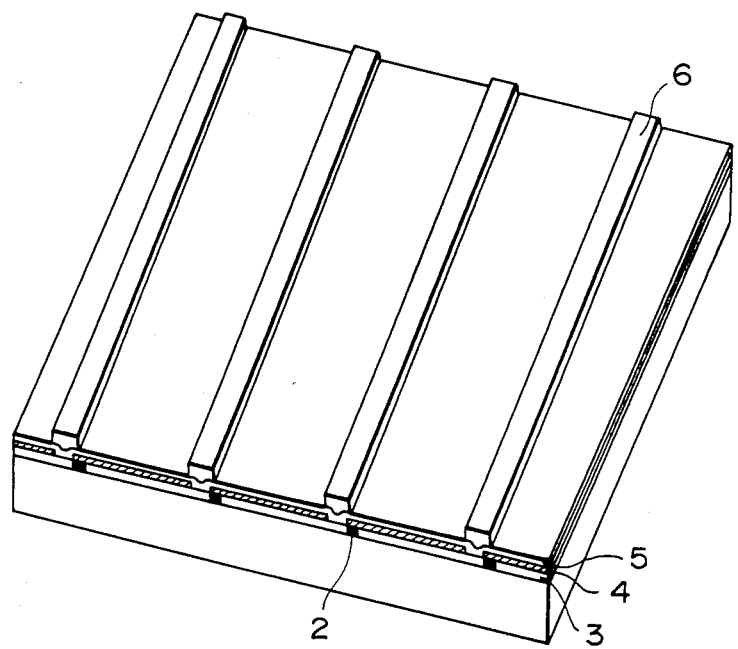
F I G. 1C

FERROELECTRIC LIQUID CRYSTAL DEVICE WITH METALLIC AUXILIARY ELECTRODES PROVIDED ADJACENT TO THE TRANSPARENT ELECTRODES

FIELD OF THE INVENTION AND RELATED ART

The present invention relates to a liquid crystal device, such as a liquid crystal display device and a liquid crystal optical shutter array, and more particularly, to an electrode structure on a substrate constituting a liquid crystal cell using a ferroelectric liquid crystal.

Recently, the application of a liquid crystal device using a ferroelectric liquid crystal to a high-precision large-size display has been considered because of its high-speed response characteristic and memory characteristic. As a structure for constituting such a display apparatus, there is known a so-called simple matrix system, wherein scanning electrodes and signal electrodes respectively are disposed in the form of stripes on mutually parallel planes to intersect with each other such that each intersection forms a pixel or picture element. The liquid crystal device of the simple matrix system involves a problem that the electrode width becomes narrow as the degree of precision or resolution is enhanced thereby resulting in an increase in the resistance of an electrode line. For this reason, there arises a difference in voltage even on one electrode line and therefore an appropriate voltage required for driving is not applied to respective pixels. In order to solve this problem, it has been proposed to provide a metallic auxiliary electrode along a transparent electrode. By this measure, the resistance of each electrode can be lowered so that the difference in voltage on the electrode can be removed.

On the other hand, among the ferroelectric liquid crystals known heretofore, those having a chiral smectic C phase (SmC*), I phase (SmI*), G phase (SmG*) or H phase (SmH*) have been considered most practical. A ferroelectric liquid crystal in such a chiral smectic phase, when sandwiched between base plates having a step or unevenness, is liable to have orientation or alignment defects, so that it fails to provide a uniform monodomain. As a result, when an auxiliary electrode is formed along a transparent electrode in a manner as described above, the auxiliary electrode provides a step on a substrate, whereby the ferroelectric liquid crystal does not form a uniform monodomain and fails to provide a proper driving characteristic.

SUMMARY OF THE INVENTION

An object of the present invention is to provide a ferroelectric liquid crystal device showing a proper driving characteristic without the above mentioned problems of the prior art.

According to the present invention, there is provided a ferroelectric liquid crystal device having a cell structure comprising two base plates each provided with transparent electrodes and a ferroelectric liquid crystal disposed between the base plates, wherein an auxiliary layer is provided adjacent to the transparent electrode, the auxiliary layer comprising insulating films and auxiliary electrodes disposed alternately, the auxiliary electrodes being respectively connected to the transparent electrodes.

The auxiliary layer has a generally flat surface because of the alternate disposition of the auxiliary electrodes and insulating films, so that formation of steps on a base plate surface is avoided to provide a uniform monodomain alignment of a ferroelectric liquid crystal and provide proper driving characteristic of a ferroelectric liquid crystal device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are sectional views across the thickness showing a pair of base plates respectively with and without spacers according to the present invention, FIG. 1C is a perspective view of the base plate with spacers shown in FIG. 1A;

DETAILED DESCRIPTION OF THE PREFERRED EMBODIMENTS

Figure 2A:
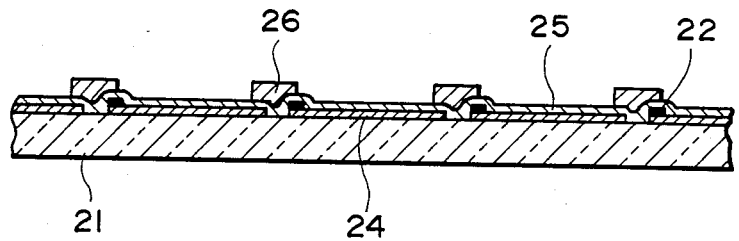
FIGS. 2A and 2B are sectional views showing a pair of base plates according to the prior art.

The basic structure of the ferroelectric liquid crystal device according to the present invention is explained with reference to FIGS. 1A–1C showing an embodiment thereof. FIGS. 1A and 1C are a sectional view and a perspective view, respectively, of a base plate (electrode plate) with spacers, and FIG. 1B is a sectional view of a flat base plate (counter electrode plate) which, in combination with the base plate shown in FIG. 1A, constitutes a pair of substrates sandwiching a ferroelectric liquid crystal to form a liquid crystal device according to the present invention. FIGS. 1A and 1B are sectional views across the thickness respectively taken along a line perpendicularly intersecting with the stripe electrodes.

Referring to FIGS. 1A and 1C, the base plate shown therein comprises a substrate 1 formed of glass, plastic, etc.; auxiliary electrodes 2 formed of a metal such as aluminum, chromium or silver; an insulating film 3 formed of, e.g., $SiO_2$, transparent electrodes 4 in the form of stripes of, e.g., ITO (indium tin oxide); an alignment or orientation control film 5 formed of, e.g., polyimide, polyvinyl alcohol, or polyamide; and spacers 6. More specifically, the auxiliary electrodes 2 and the insulating films 3 of, e.g., $SiO_2$, are alternately formed on the substrate 1 so as to provide a flat upper surface, on which are further disposed the transparent stripe electrodes 4 so that the auxiliary electrodes 2 are electrically connected to a part of the stripe electrodes 4. The thickness of the transparent stripe electrodes 4 is ordinarily on the order of 50–3000Å, preferably on the order of 300–1500 Å. On the other hand, the thickness of the auxiliary electrodes 2 is ordinarily on the order of 50–2000Å. Further, the width $l_2$ of the auxiliary electrodes 2 may preferably be determined so as to satisfy the relationship with the width $l_4$ of the stripe electrodes 4 as follows:

$$l_4/100 < l_2 < l_4/10.$$

The alignment control film 5 of, e.g., polyimide, is uniformly formed on the stripe electrodes 4, and remaining concavities or grooves between the stripe electrodes 4 are covered with spacers 6. In the manner as described above, the stepwise difference in height given by the auxiliary electrodes 2 is removed by filling the concavities or grooves between the auxiliary electrodes with the alternately provided insulating films 3 to provide a flat alignment surface, whereby a uniform monodomain alignment or orientation of liquid crystal molecules is accomplished. In this instance, a uniaxial aligning treatment such as a rubbing treatment is implemented to the above-mentioned alignment control film 5 in order to provide a monodomain alignment.

The above-mentioned structure of the base plate with spacers (spacer base plate as shown in FIGS. 1A and 1C) is more specifically explained together with the structure of the base plate without spacers (flat base plate) as shown in FIG. 1B by way of production examples.

EXAMPLE 1

On one whole surface of a glass substrate 1, an Al film of 2000Å in thickness was formed by vapor deposition. From the Al film, auxiliary electrodes 2 in the form of stripes with a width of 30 μm were formed at a pitch of 250 μm by applying a 5000Å-thick photoresist, followed by prescribed patterning-exposure and etching. At this time, the 5000Å-thick patterned resist film was left on the electrodes. Then, a 2000Å-thick $SiO_2$ film was formed thereon by EB (Electron-beam) vapor deposition, and the remaining resist film was etched by an etchant to lift-off the $SiO_2$ film thereon whereby an insulating film 3 was formed. Through the above steps, no difference in thickness was left between the auxiliary electrodes 2 and the insulating film 3, whereby a flat surface was formed.

Then, on the whole surface including the auxiliary electrodes, an ITO film was formed by vapor deposition and etched to leave stripe ITO electrodes 4 of 230 μm-width at a pitch of 250 μm, so that a part of the width thereof coincided with the auxiliary electrodes. Further thereon, a polyimide film 5 for liquid crystal alignment was formed in a thickness of 1000Å by spinner coating and subjected to curing. Then, stripe spacers 6 were disposed on the polyimide film in parallel with the stripe electrodes. The spacers were formed at a height of 1.2 μm with polyimide and disposed above the gaps between the electrodes. The thus prepared base plate was free of steps as observed on conventional base plates.

On the other hand, a flat base plate opposing the above spacer base plate and having substantially the same structure except for the spacers was similarly prepared.

More specifically, on the whole surface of a glass substrate 11, a 2000Å-thick Al film was formed by vapor deposition. On the Al film, a 5000Å-thick photoresist was applied and subjected to prescribed patterning exposure and etching to leave auxiliary electrodes 12 in the form of stripes having a 30 μm-width at a pitch of 250 μm. Then, a 2000Å-thick $SiO_2$ film wall formed thereon by EB vapor deposition and patterned by lifting-off through etching of the remaining resist film to form an insulating film 13. Then, on the whole surface including the auxiliary electrodes 12 and the insulating film 13, an ITO film was formed by vapor deposition and etched to leave stripe ITO electrodes 14 of 1000Å in thickness and 230 μm in width at a pitch of 250 μm, so that a part thereof was overlaid on the auxiliary electrodes 13 to ensure electrical connection. Then, in order to fill the stepwise concavities between the ITO electrodes 14, an $SiO_2$ insulating film 16 was formed by vapor-deposition on the whole surface in a 1000Å-thickness. The $SiO_2$ insulating layer 16 was also effective in remarkably improving the insulation between the base plates. On the insulating layer 16, a polyimide film 15 was formed in a 1000Å-thickness similar as in the case of the spacer base plate.

Then, the thus prepared two base plates were respectively subjected to a rubbing treatment, were arranged and secured to each other so that their stripe electrodes overlapped perpendicular to each other and their rubbing directions were parallel with each other to form a cell structure. In the liquid crystal cell thus prepared, a ferroelectric liquid crystal composed of the following components was sealed.

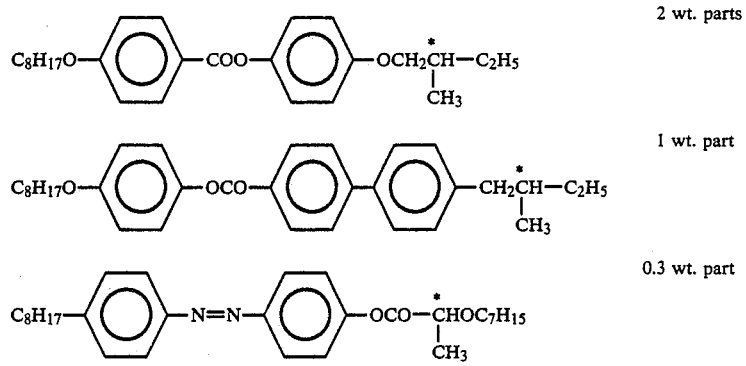

According to an observation through a polarizing microscope, the above 3-component mixture liquid crystal showed SmC* phase in the temperature range of 4°–35° C. The mixture liquid crystal sealed up in the liquid crystal cell was then heated to the isotropic phase and then gradually cooled at a rate of 0.5° C./hr to effect alignment. As a result of microscopic observation of the liquid crystal cell, a monodomain with very little alignment defect was observed to have been formed. The liquid crystal also showed bistability including first and second stable states.

Further, by taking out lead wires from the edges of the cell base plates and applying pulse voltages through the lead wires to respective pixels formed at the intersections of the ITO electrodes, switching between the above mentioned states could be effected at voltages of ±18 volts at 1 msec.

In this way, the respective pixels were uniformly switched at a constant voltage, whereby it was confirmed that practically no difference in voltage was present on an electrode line.

EXAMPLE 2

Experiments similar to those carried out in Example 1 were conducted except for using DOBAMBC of the following formula:

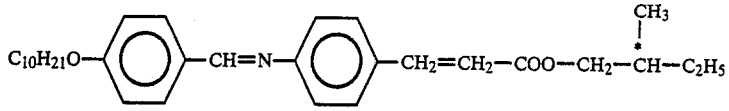

whereby a sufficiently uniform monodomain alignment was obtained. Further, a driving voltage required for switching was ±16 volts at 1 msec, and good driving characteristics similar to those in Example 1 were obtained.

COMPARATIVE EXAMPLE 1

Figure 2B:
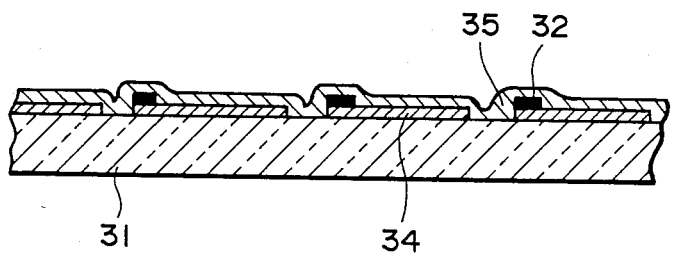

Base plates as shown in FIGS. 2A and 2B were prepared. More specifically, a spacer base plate with spacers 26 as shown in FIG. 2A was prepared by forming, on a glass substrate 21, ITO electrodes 24 and auxiliary electrodes 22 thereon. The insulating film of 2000Å-thick $SiO_2$ film used in the previous examples was removed, and a polyimide film 25 and spacers 26 were successively formed on the electrodes.

On the other hand, a flat base plate as shown in FIG. 2B opposing the spacer electrode was similarly produced by forming ITO electrodes 34, auxiliary electrodes 32 and a polyimide film 35 successively on a glass substrate 31 but without forming the spacers 26 as shown in FIG. 2B.

The structure shown in FIGS. 2A and 2B corresponds to a conventional structure, wherein conspicuous steps are formed on the base plate face from which alignment defects are liable to develop.

In this Comparative Example, a cell was prepared from the above-mentioned spacer base plate and flat base plate, and the 3-component mixture liquid crystal was sealed up therein similarly as in Example 1. Experiments similar to those in the above-mentioned examples were conducted. As a result, zigzag alignment defects developed from the stepwise differences on the base plates, and the bistability was broken from the alignment defects, whereby a state obtained after switching was observed to immediately return to an original more stable state.

As described hereinabove, according to the present invention, steps of auxiliary electrodes required for decreasing a resistance along a transient electrode line are removed by forming insulating films alternately with the auxiliary electrodes, thereby to provide a uniform monodomain alignment. As a result, proper driving characteristic may be attained even in a case where a ferroelectric liquid crystal is used.

What is claimed is:

1. In a ferroelectric liquid crystal device having a cell structure comprising two base plates each provided with transparent electrodes, and a ferroelectric liquid crystal disposed between the base plates; the improvement wherein an auxiliary layer is provided adjacent to the transparent electrode; said auxiliary layer comprising insulating films and auxiliary electrodes disposed alternately; said auxiliary electrodes being respectively connected to the transparent electrodes.

2. A liquid crystal device according to claim 1, wherein said auxiliary layer comprising the alternately disposed insulating films and auxiliary electrodes provides a flat surface.

3. A liquid crystal device according to claim 1, wherein said ferroelectric liquid crystal is in a chiral smectic phase.

4. A liquid crystal device according to claim 1, wherein said ferroelectric liquid crystal is a liquid crystal showing at least two stable states in the absence of an electric field.

5. A liquid crystal device according to claim 1, wherein said auxiliary electrodes comprise a metal.

6. A liquid crystal device according to claim 5, wherein said auxiliary electrodes comprise aluminum, chromium, or silver.

7. A liquid crystal device according to claim 1, wherein said insulating films comprise an inorganic substance.

8. A liquid crystal device according to claim 7, wherein said insulating films comprise $SiO_2$.

9. A liquid crystal device according to claim 1, wherein said auxiliary layer comprising the alternately disposed insulating films and auxiliary electrodes has been formed through the lifting-off method.

10. A liquid crystal device according to claim 1, wherein at least one of said two base plates is provided with an alignment control film.

11. A liquid crystal device according to claim 10, wherein at least one of said two base plates is a spacer base plate provided with an alignment control film and spacers.

12. A liquid crystal device according to claim 11, wherein said spacers are disposed between the transparent electrodes.

13. A liquid crystal device according to claim 1, wherein at least one of said two base plates further comprises a uniformly extending insulating film coating the transparent electrodes and the auxiliary layer disposed adjacent to the transparent electrodes.

14. A liquid crystal device according to claim 1, wherein said transparent electrodes are formed in stripes each having a width $l_4$, and said auxiliary electrodes are disposed along and in contact with the transparent electrodes also in the form of stripes each having a width $l_2$ satisfying the relationship of:

$$l_4/100 < l_2 < l_4/10.$$

15. A liquid crystal device according to claim 12, wherein said spacers extend to cover the auxiliary electrodes.

* * * * *